United States Patent
Simanzhenkov et al.

(10) Patent No.: US 12,491,479 B2
(45) Date of Patent: Dec. 9, 2025

(54) INHERENTLY SAFE OXYGEN/HYDROCARBON GAS MIXER

(71) Applicant: NOVA CHEMICALS (INTERNATIONAL) S.A., Fribourg (CH)

(72) Inventors: Vasily Simanzhenkov, Calgary (CA); Shahin Goodarznia, Calgary (CA); Bolaji Olayiwola, Calgary (CA); Kamal Serhal, Calgary (CA); Michael Koselek, Red Deer (CA)

(73) Assignee: NOVA Chemicals (International) S.A., Fribourg (CH)

( * ) Notice: Subject to any disclaimer, the term of this patent is extended or adjusted under 35 U.S.C. 154(b) by 971 days.

(21) Appl. No.: 17/611,770

(22) PCT Filed: Jul. 15, 2020

(86) PCT No.: PCT/IB2020/056652
§ 371 (c)(1),
(2) Date: Nov. 16, 2021

(87) PCT Pub. No.: WO2021/019347
PCT Pub. Date: Feb. 4, 2021

(65) Prior Publication Data
US 2022/0241744 A1    Aug. 4, 2022

Related U.S. Application Data

(60) Provisional application No. 62/879,080, filed on Jul. 26, 2019.

(51) Int. Cl.
*B01F 23/232*    (2022.01)
*C07C 5/48*    (2006.01)
(Continued)

(52) U.S. Cl.
CPC ............. *B01F 23/232* (2022.01); *C07C 5/48* (2013.01); *C07C 7/005* (2013.01);
(Continued)

(58) Field of Classification Search
CPC ............................ B01F 23/214; B01F 23/232
See application file for complete search history.

(56) References Cited

U.S. PATENT DOCUMENTS 4,482,524 A * 11/1984 Hardison ............... C01B 17/05
422/231
4,624,791 A * 11/1986 Ferriss ................... C02F 1/28
95/170

(Continued)

FOREIGN PATENT DOCUMENTS

DE    19641013 A1 *  7/1997  ............ B01F 3/0446

OTHER PUBLICATIONS

Gaddis, E. S. (1999). Mass transfer in gas-liquid contactors. Chemical Engineering and Processing: Process Intensification, 38(4-6), 503-510. (Year: 1999).*

(Continued)

*Primary Examiner* — Claire X Wang
*Assistant Examiner* — Patrick M McCarty
(74) *Attorney, Agent, or Firm* — Fish & Richardson P.C.

(57) ABSTRACT

A method of safely mixing a hydrocarbon with an oxidant is provided. The hydrocarbon and oxidant are saturated with a non-flammable liquid in pre-mix zones that are flooded with the non-flammable liquid and fluidly connected to a common mixing zone that is partially flooded with the non-flammable liquid. The saturated hydrocarbon and oxidant combine within the common mixing zone forming bubbles of a homogeneous gas mixture of hydrocarbon and oxidant, preferably in a ratio of hydrocarbon to oxidant that is outside of the flammability limit, that can exit the non-flammable (Continued)

liquid into a headspace where it can be retrieved for use in an oxidative reaction process such as oxidative dehydrogenation.

18 Claims, 4 Drawing Sheets

(51) Int. Cl.
   *C07C 7/00* (2006.01)
   *C07C 7/148* (2006.01)
   *B01F 25/40* (2022.01)
   *B01F 27/05* (2022.01)
   *C07C 7/04* (2006.01)

(52) U.S. Cl.
   CPC .......... *C07C 7/14816* (2013.01); *B01F 25/40* (2022.01); *B01F 27/05* (2022.01); *C07C 7/04* (2013.01)

(56) References Cited

U.S. PATENT DOCUMENTS

| | | | | |
|---|---|---|---|---|
| 4,674,888 A * | 6/1987 | Carlson | ............ | B01F 25/43151 |
| | | | | 162/57 |
| 5,030,362 A * | 7/1991 | Da Silva | ........... | B01F 23/23123 |
| | | | | 261/122.1 |
| 5,696,285 A * | 12/1997 | Roby | .................. | C07C 51/265 |
| | | | | 562/416 |
| 5,780,683 A * | 7/1998 | Greene | .................. | C07C 29/50 |
| | | | | 568/350 |
| 6,395,175 B1 * | 5/2002 | Gao | ........ | B01F 25/433 |
| | | | | 210/205 |
| 7,414,149 B2 | 8/2008 | DeCourcy et al. | | |
| 2004/0133057 A1 | 7/2004 | Jiang et al. | | |
| 2007/0155985 A1 * | 7/2007 | Wonders | .................... | B01J 8/30 |
| | | | | 422/600 |
| 2014/0010936 A1 * | 1/2014 | Boily | ................. | A47J 31/4485 |
| | | | | 426/474 |
| 2014/0145356 A1 * | 5/2014 | Brosten | ................. | B01F 8/1827 |
| | | | | 261/78.2 |
| 2014/0249339 A1 | 9/2014 | Simanzhenkov et al. | | |
| 2018/0009662 A1 | 1/2018 | Simanzhenkov et al. | | |
| 2019/0194091 A1 * | 6/2019 | Mitkidis | .................... | C07C 5/48 |
| 2019/0218161 A1 | 7/2019 | Simanzhenkov et al. | | |
| 2020/0223768 A1 * | 7/2020 | Van Rossum | ............. | C07C 5/48 |

OTHER PUBLICATIONS

EP Office Action in European Appln. No. 20743846.6, dated May 30, 2023, 6 pages.

PCT International Search Report and Written Opinion in International Appln. No. PCT/IB2020/056652, mailed on Nov. 6, 2020, 10 pages.

* cited by examiner

INHERENTLY SAFE OXYGEN/HYDROCARBON GAS MIXER

CROSS-REFERENCE TO RELATED APPLICATION

This application is a National Stage Application under 35 U.S.C. § 371 and claims the benefit of International Application No. PCT/IB2020/056652, filed Jul. 15, 2020, which claims priority to U.S. Ser. No. 62/879,080, filed on Jul. 26, 2019. The disclosure of the prior application is considered part of and is incorporated by reference in the disclosure of this application.

TECHNICAL FIELD

This present invention relates to an apparatus and method for the safe mixing of gases. More specifically, the present invention relates to a method for the safe mixing of a hydrocarbon, such as ethane, with an oxidant, such as oxygen, in a manner that risk of an explosive event is minimized. Additionally, a gas mixer suitable for use with the method is described. The method and the gas mixer are applicable for use in oxidative processes such as the catalytic oxidative dehydrogenation of ethane into ethylene.

BACKGROUND ART

Mixing of a hydrocarbon with an oxidant is associated with potentially catastrophic consequences. When the ratio of hydrocarbon to oxygen within a mixture is within the flammability envelope, ignition can result in a runaway reaction which can lead to an explosive event, particularly when under pressure. For processes where mixing of hydrocarbons with oxygen is required, consideration of how to minimize the likelihood of ignition is always a primary consideration. While processes for catalytic oxidation of hydrocarbons, for example oxidative dehydrogenation (ODH) of paraffins into olefins, are typically performed with mixtures of hydrocarbons and oxygen that are outside the flammability envelope there is still potential for ignition when the mixture is heterogeneous and includes hotspots where the ratio of hydrocarbon to oxygen is within explosive limits. This is particularly true when the components are in the initial phase of mixing before homogeneity is achieved.

It is commonly known that for ignition to occur there must be both a mixture of hydrocarbon and oxygen within the flammability envelope and an ignition event. An ignition event may take the form of entrained particles present within either the hydrocarbon-containing gas or the oxidant-containing gas striking a metallic surface within the mixing apparatus and creating a spark. If the spark occurs in a region near where streams of the hydrocarbon-containing gas and oxidant-containing gas meet and have not reached homogeneity outside flammability limits, ignition may result. With that in mind, it is not surprising that prior art options for minimizing the risk of an explosive event when mixing hydrocarbons and oxygen are mainly focused on either decreasing the chances of an ignition causing spark, or by maximizing the rate of mixing to shorten the window when ignition may occur due to the existence of heterogeneous pockets of hydrocarbon/oxygen compositions inside the flammability limit.

It is known that mixing bubbles of gas comprising a hydrocarbon with bubbles of gas comprising an oxidant within a mixer flooded with a non-flammable liquid reduces the risk of an explosive event as the reactive components are surrounded by the flash arresting non-flammable liquid. For examples of mixers of this type see US2004/0133057 and US2018/0009662. A potential issue with flooded mixers is that the presence of contaminants within hydrocarbon feed streams may give rise to fouling, where deposits can form on the mixer components, particularly mixing elements such as static mixers. For example, sulfur contaminants such as hydrogen sulfide can form elemental sulfur and volatile metals, such as carbonyls, can form small particles of solid oxides. Over time the elemental sulfur and solid oxides can adhere to components, eventually accumulating to a point where fouling issues can occur.

The result of extensive fouling may give rise to pockets where bubbles of hydrocarbon and bubbles of oxidant can mix in ratios inside the flammability limit. It is an objective of the present invention to provide a method for mixing a hydrocarbon with an oxidant that further reduces the risk of forming unstable gas compositions. A gas mixer suitable for use with the method is also described.

SUMMARY OF INVENTION

In one aspect, a method of mixing a hydrocarbon-containing gas with an oxidant-containing gas is provided, the method comprising:
introducing a first gas and optionally a first inert diluent into a first pre-mix zone flooded with a non-flammable liquid to form a first saturated gas;
introducing a second gas and optionally a second inert diluent into a second pre-mix zone flooded with the non-flammable liquid to form a second saturated gas;
mixing the first saturated gas and the second saturated gas in a common mixing zone partially flooded with the non-flammable liquid and comprising a flooded region and a headspace, to form a homogeneous gas mixture comprising the first gas, optionally the first inert diluent, the second gas, optionally the second inert diluent, and non-flammable liquid, that is outside the flammability limit, whereby the term homogeneous is not limited to one phase mixtures, but rather includes aerosols and or suspensions and refers of to even distribution of all the phases in the mixture through the process equipment space; and
recovering the homogeneous gas mixture from the head space;
wherein the first gas and the second gas are different and are selected from a hydrocarbon-containing gas and an oxidant-containing gas.

Further, in accordance with another aspect, a gas mixer for mixing a hydrocarbon-containing gas with an oxidant-containing gas is provided, the gas mixer comprising:
a first pre-mix zone flooded with a non-flammable liquid and configured to receive a first gas from a first gas supply line and form a first saturated gas;
a second pre-mix zone, physically separated from the first pre-mix zone, flooded with a non-flammable liquid and configured to receive a second gas from a second gas supply line and form a second saturated gas;
a common mixing zone partially flooded with a non-flammable liquid resulting in a head space and a flooded region, the flooded region separately fluidly connected to the first pre-mix zone and second pre-mix zone and configured to separately receive the first saturated gas and the second saturated gas; and a homogeneous gas mixture outlet for removing from the head space a homogeneous gas mixture comprising the first gas and the second gas.

DESCRIPTION OF EMBODIMENTS

Figure 1:
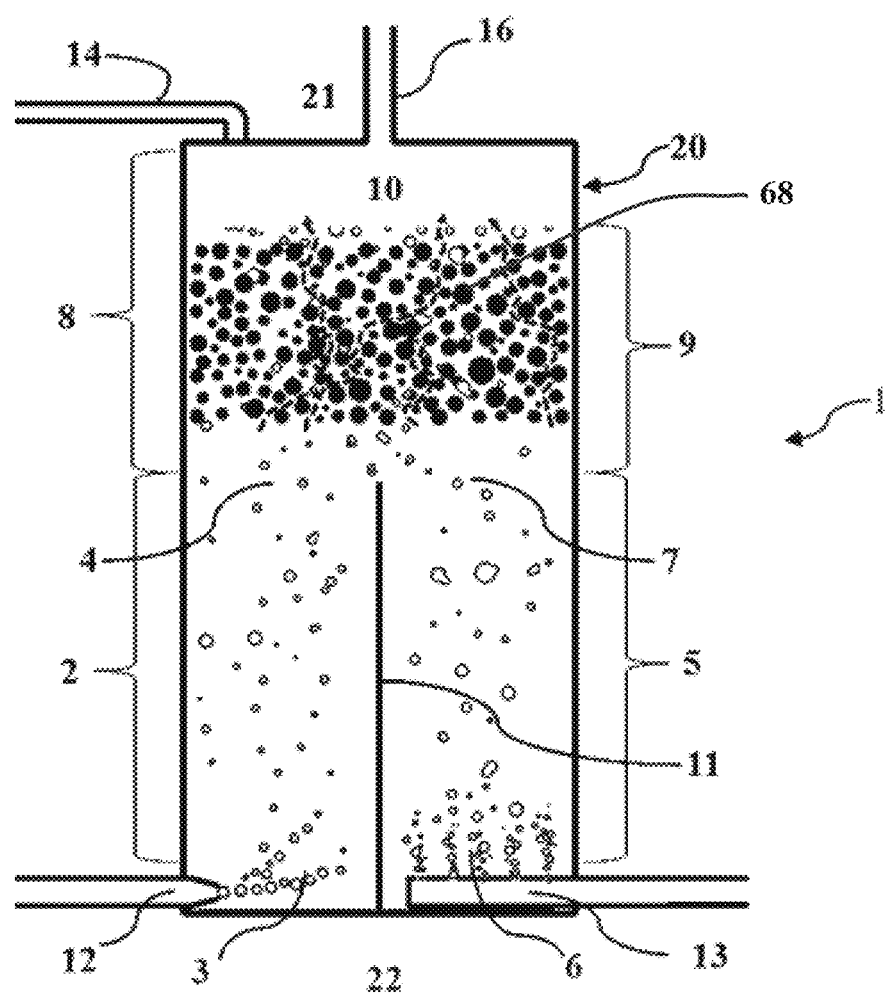
FIG. 1—Schematic representation of the gas mixer of the present invention.

Provided herein is a method for mixing a hydrocarbon-containing gas with an oxidant-containing gas and a gas mixer apparatus useful for the method described.

The present invention is relevant for applications that require the mixing of a hydrocarbon-containing gas with an oxidant-containing gas. It is well known that gaseous compositions containing a hydrocarbon and oxygen in ratios that fall within the flammability envelope are potentially hazardous. An ignition event, such as a spark, can ignite the mixture and potentially lead to an explosion. While applications that require mixing of hydrocarbons and oxygen normally do so with ratios that are safe and not susceptible to ignition there are moments during initial mixing where heterogeneous pockets of unfavorable hydrogen/oxygen compositions exist and may ignite if a spark occurs.

The present invention seeks to provide a method for mixing a hydrocarbon-containing gas with an oxidant-containing gas that is simple and safe in that ignition events are unlikely to occur. The method comprises introducing a hydrocarbon-containing gas into a first pre-mix zone, introducing an oxidant-containing gas into a second pre-mix zone, the first pre-mix zone and the second pre-mix zone flooded with a non-flammable liquid. The hydrocarbon-containing gas and the oxidant-containing gas form bubbles within the first pre-mix zone and second pre-mix zone, respectively, that travel through the respective pre-mix zone, becoming saturated with the non-flammable liquid before entering a common mixing zone that is partially flooded with the non-flammable liquid and comprises a flooded region and a head space. Within the flooded region, bubbles of the hydrocarbon-containing gas saturated with non-flammable liquid mix with bubbles of the oxidant-containing gas saturated with non-flammable liquid, to form bubbles of a homogeneous gas mixture of the hydrocarbon-containing gas and the oxidant-containing gas, the homogeneous gas mixture saturated with the non-flammable liquid. The bubbles of the homogeneous gas mixture can exit the flooded region into the head space where the homogeneous gas mixture can be removed for use downstream in a process that requires a mixture of a hydrocarbon with an oxidant. The term homogeneous in reference to the gas mixture is intended to mean that the components of the gas, including aerosol components if present, are generally evenly dispersed throughout.

As the term suggests, the non-flammable liquid used with the method must not be flammable. Not flammable or non-flammable in this context means: material cannot be ignited under any circumstances within the process, described in the method. That is, the non-flammable liquid must not be capable of igniting or burning. Suitable non-flammable liquids include water, ethylene glycol, silicon oils, and carbon tetrachloride. The non-flammable liquid must also be non-reactive with either the hydrocarbon or the oxidant. In a preferred embodiment the non-flammable liquid comprises water.

While any non-flammable liquid may be used with the present invention it is important to consider that the homogeneous gas mixture removed from the head space will comprise the hydrocarbon-containing gas, oxidant-containing gas, and some carry-over of non-flammable liquid in vapor form, and inert diluent if used. For this reason, selection of a non-flammable liquid must consider any potential effects the carry-over of non-flammable liquid may have on downstream applications. For example, some catalysts used in ethane ODH are sensitive to water (in liquid form) and therefore the water is preferably removed from the homogeneous gas mixture before use in ethane ODH. Alternatively, the homogeneous gas mixture is heated to a temperature where the water present is converted to steam before use in ethane ODH. In some embodiments, the non-flammable liquid is water and the temperature of the homogeneous gas mixture is raised to at least 100° C., preferably to a temperature of at least 150° C., but not exceeding 300° C., preferably not exceeding 250° C., before use in ethane ODH. It is contemplated for the present invention that non-flammable liquid within the homogeneous gas mixture is captured and recycled back to one or more of the first pre-mix zone, the second pre-mix zone, and the common mixing zone.

In an embodiment of the invention, the non-flammable liquid is water and the homogeneous gas mixture removed from the head space is subjected to a separation step to, at least partially, remove the non-flammable liquid from the homogeneous gas mixture.

In one embodiment the invention, the non-flammable liquid is water and the homogeneous gas mixture is passed through a condenser to condense and subsequently separate water present in the homogeneous gas mixture from the hydrocarbon and the oxidant, the separated water recycled back to one or more of the first pre-mix zone, the second pre-mix zone, and the common mixing zone.

In working this invention, the amount of the gases introduced into the pre-mix zones results in a homogeneous gas mixture that comprises a ratio of hydrocarbon-containing gas to oxidant-containing gas that is preferably outside of the flammability envelope. The chosen ratio will depend on the nature of the gases and the application for which the mixture will be used. For example, for an ethane ODH application, the ratio of ethane to oxygen chosen will depend on whether under the proposed ODH reaction conditions the ratio is above the higher explosive limit or below the lower explosive limit. In comparison, an application that requires or includes the addition of ethylene, the ratio of ethylene to oxygen added to the reactor would be different because ethylene is more reactive than ethane. The temperature of the ODH process to be employed must also be taken into consideration as higher temperatures correspond to a much smaller window of safe ratios of ethane to oxygen. For example, at temperatures below 300° C. and pressures below 450 kPa a molar ratio of about 80:20 ethane to oxygen for catalytic ODH would fall above the upper explosive limit, while a ratio of about 1.5:98.5 ethane to oxygen would fall below the lower explosive limit, with each ratio safe enough in that ignition events would not lead to an explosion or flame propagation under ODH reaction conditions. Ratios falling between that—50:50 for example—would be unsafe and potentially flammable/explosive.

In an embodiment of the invention, the hydrocarbon-containing gas comprises ethane.

In processes such as ODH of ethane the conversion rates often do not exceed 70%, leaving unconverted ethane in the product stream. The unconverted ethane can be isolated from the product stream, using distillation for example, and recycled back to be used in the ODH process. In an embodiment of the invention, the hydrocarbon-containing gas comprises ethane recycled from an oxidative process. In another embodiment of the invention, the hydrocarbon-containing gas comprises ethane recycled from an ODH process.

In an embodiment of the invention, the oxidant-containing gas comprises oxygen.

In another embodiment of the invention, the oxidant-containing gas comprises air.

The present invention also contemplates the use of inert diluents for the hydrocarbon-containing gas and the oxidant-containing gas. One or both of the hydrocarbon-containing gas and the oxidant-containing gas may be diluted with an inert diluent prior to entering or within each of the respective pre-mix zone. Use of inert diluents when mixing an oxidant with a hydrocarbon is well known. Example diluents include carbon dioxide, steam, nitrogen, helium and argon. The inert diluents are "inert" in that the diluent does not participate in any of the reactions with other reactants (e.g. nitrogen in ethane ODH), or the exotherm of the diluent's reaction with other reactants is lower than the exotherm of the target reaction (e.g. carbon dioxide in ethane ODH). The use of inert diluents has an impact on the flammability ratio, a property of mixed gases that falls within the knowledge of the person skilled in the art. Both the hydrocarbon-containing gas and the oxidant-containing gas may be diluted with the same or different inert diluents.

Another consideration is determining the flow rate at which each gas is added to the respective pre-mix zones. The flow rate of the gases and the corresponding pressure within the gas supply line would need to be higher than the pressure of the non-flammable liquid. In the absence of a pressure differential the gases cannot enter the non-flammable liquid and consequently the pre-mix zone. Furthermore, if the pressure of the non-flammable liquid is higher than the line containing the gas to be introduced there may be, in the absence of a back-flow prevention mechanism, back flow of non-flammable liquid into the gas supply lines. This should be avoided. Back-flow prevention may include methods known in the art, including, but not limited to, use of one-way valves, check valves, pressure controlling devices, and knock-out/flush vessels on the gas supply line equipped with a level indicator alarm.

When determining flow rates, the skilled worker must correlate the flow rates with the pressure and temperature used within the gas mixer. The conditions within the gas mixer are chosen to reflect the amount of carryover of non-flammable liquid into the homogeneous gas mixture removed from the head space. The flow rate of the incoming gases must be sufficient to allow entry into the non-flammable liquid at the predetermined temperature and pressure. Calculating flow rates and residence time for a gas mixer with particular dimensions would fall within the knowledge of the person skilled in the art.

The gas mixer of the present disclosure comprises a first pre-mix zone flooded with a non-flammable liquid, a second pre-mix zone physically separated from the first pre-mix zone and flooded with the non-flammable liquid, and a common mixing zone partially flooded with the non-flammable liquid to form a flooded region and a head space, wherein the first pre-mix zone and second pre-mix zone are separately fluidly connected to the flooded region. The first pre-mix zone is configured to receive a first gas from a first gas supply line and the second pre-mix zone is configured to receive a second gas from a second gas supply line. First gas received in the first pre-mix zone and second gas received in the second pre-mix zone may form bubbles within the non-flammable liquid within the respective zones. A small fraction of the non-flammable liquid may convert to a gaseous state and enter into the bubbles of the first gas and second gas within the pre-mix zones. As the bubbles pass through the first pre-mix zone and the second pre-mix zone, they may become saturated with the non-flammable liquid, the gaseous non-flammable liquid diffusing within the bubbles, resulting in the formation of bubbles of a first saturated gas mixture in the first pre-mix zone and bubbles of a second saturated gas mixture in the second pre-mix zone. Upon entering the flooded region of the common mixing zone, the bubbles of the first saturated gas mixture combine with bubbles of the second saturated gas mixture to form bubbles of homogeneous gas mixture comprising first gas and second gas, saturated with non-flammable liquid. The bubbles of the homogeneous gas mixture may pass into the head space for removal.

The first gas and second gas are different and are selected from a hydrocarbon-containing gas and an oxidant-containing gas. Preferably, the ratio of hydrocarbon to oxidant in the homogeneous gas mixture falls outside of the flammability limit. The invention allows for safe mixing of a hydrocarbon with an oxidant which is beneficial for oxidative processes that require these mixtures.

As mentioned, the non-flammable liquid used within the gas mixer must not be flammable. Suitable non-flammable liquids include water, ethylene glycol, silicon oils, and carbon tetrachloride. The non-flammable liquid should also be non-reactive with the hydrocarbon or the oxidant. In a preferred embodiment the non-flammable liquid comprises water.

Reference to a first gas and a second gas is intended to indicate that the pre-mix zones in which the gases are introduced are not specific for either a hydrocarbon-containing gas or an oxidant-containing gas. That is, when the first gas is a hydrocarbon-containing gas the second gas is an oxidant-containing gas. Conversely, when the first gas is an oxidant-containing gas the second gas is a hydrocarbon-containing gas.

The first pre-mix zone and the second pre-mix zone are configured to receive a first gas and a second gas, respectively, which enter the non-flammable liquid as bubbles of gas at a front end of the respective zone, and to produce bubbles of gas saturated with non-flammable liquid at a back end which is fluidly connected to the flooded region of the common mixing zone. Use of the term saturation refers to the interior of the bubbles of the gas and the degree to which the gaseous form of the non-flammable liquid enters the interior of the bubbles during the passage from the front end to the back end of the respective zones. The term front end refers to the position within the first pre-mix zone and the second pre-mix zone that is at or near the most distant location relative to the flooded region. The back end refers the position in the first pre-mix zone and the second pre-mix zone that fluidly connects with the flooded region. The dimensions of the first pre-mix zone and the second pre-mix zone are configured so that under operating conditions the bubbles are close to being or are completely saturated with non-flammable liquid prior to reaching the flooded region of the common mixing zone. Diffusion rates of non-flammable liquid into the bubbles vary according to temperature, pressure, and the size of the bubbles. Higher temperatures and pressures size are associated with higher rates of diffusion of non-flammable liquid into the bubbles in comparison to lower temperatures and pressures. Also, smaller bubbles can reach saturation sooner than larger bubbles. It is contemplated by the present invention to include mechanisms for limiting the size of the bubbles, including the use of static mixers or by placing one or more mesh screens along the path from the front end to the back end of the corresponding pre-mix zone. These mechanisms promote the separation of large bubbles into smaller bubbles and selection and configuration of a particular mechanism can limit bubble to a predetermined size. For example, a No. 18 mesh provides an opening of approximately 1 $mm^2$ which would theoretically limit bubbles to around 1 mm in diameter. Choosing a size means considering the size of the pre-mix zones and how long bubbles take to pass from the front end to the back end. Bubbles should ideally be less than 1 mm in diameter, preferably below 0.5 mm in diameter, more preferably below 0.1 mm in diameter.

The path for bubbles within the first pre-mix zone and second pre-mix zone may take any form, including a straight horizontal or vertical path, a spiral path, or a combination. The first pre-mix zone and second pre-mix zones need not be similar. In an embodiment of the invention the first pre-mix zone and the second pre-mix zone are vertical and fluidly connected to the bottom of a vertical common mixing zone, the first pre-mix zone and second pre-mix zone extending downwardly with respect to the common mixing zone. In another embodiment, one or both of the first pre-mix zone and the second pre-mix zone comprise a pipe with a front end that is vertically above the flooded region of the common mixing zone. In another embodiment, one or both of the first pre-mix zone and the second pre-mix zone are horizontally oriented and extend away from the common mixing zone.

Movement of the bubbles through the first pre-mix zone, the second pre-mix zone, and the flooded region may occur by gravity. Bubbles of gas naturally rise vertically through the higher density non-flammable liquid. Movement may also be encouraged using pressure and or other mechanisms known in the art for allowing flow of gases within a liquid medium.

For the present invention there is a requirement for a means of introducing gases into the pre-mix zones and non-flammable liquid into one or more of the first pre-mix zone, the second pre-mix zone, and the common mixing zone. Any means known in the art may be employed including but not limited to a nozzle, spout, a valve, or a sparger. For simplicity, use of the term nozzle within the description in relation to the introduction of gases refers to the point where contact between the gases and the non-flammable liquid first occurs, and the means for introduction includes any means known within the art. Use of the term nozzle in relation to the introduction of non-flammable liquid refers to the point where the non-flammable liquid enters any of the first pre-mix zone, the second pre-mix zone, and the common mixing zone. Connection of a nozzle to a gas supply line would be required for both the first and second gas. It is contemplated that the gas supply line for either gas can include fresh gas or recycled gas obtained from a process downstream of the gas mixer. For example, unreacted ethane separated downstream of an oxidative dehydrogenation process can be directed back to the gas mixer for use via a recycle line that connects with either the first or second gas supply line, depending upon which line is used to introduce the hydrocarbon-containing gas.

In an embodiment of the invention, at least one of the first pre-mix zone and the second pre-mix zone are configured to receive the first gas and second gas, respectively, via a nozzle comprising a cylindrical or round spout at the end of a gas supply line.

In an embodiment of the invention, at least one of the first pre-mix zone and the second pre-mix zone are configured to receive the first gas and second gas, respectively, via a valve at the end of a gas supply line.

In an embodiment of the invention, at least one of the first pre-mix zone and the second pre-mix zone are configured to receive the first gas and second gas, respectively, via a sparger.

In an embodiment of the invention, at least one of the first pre-mix zone and the second pre-mix zone are configured to receive the first gas and second gas, respectively, through a porous sintered metal.

In an embodiment of the invention, non-flammable liquid is introduced into at least one of the first pre-mix zone, the second pre-mix zone, and the common mixing zone via a nozzle comprising a cylindrical or round spout at the end of a non-flammable liquid supply tube.

In an embodiment of the invention, non-flammable liquid is introduced into at least one of the first pre-mix zone, the second pre-mix zone, and the common mixing zone via a valve at the end of a non-flammable liquid supply tube.

Flooding of each of the first pre-mix zone and the second pre-mix zone, and the partial flooding of the common mixing zone can be achieved by direct introduction of non-flammable liquid into the zones via supply nozzles present within the respective zones. It is also contemplated by the present invention that a single non-flammable liquid supply nozzle, present in one of the first pre-mix zone, the second pre-mix zone, and the common mixing zone may be used to flood the first pre-mix zone and the second pre-mix zone and partially flood the common mixing zone. For example, a single non-flammable liquid supply nozzle present in the first pre-mix zone may supply non-flammable liquid into the first pre-mix zone to the point that even after complete flooding of the first pre-mix zone supply of non-flammable liquid is continued until non-flammable liquid from the first pre-mix zone overflows into the common mixing zone and the second pre-mix zone. A person skilled in the art would understand that non-flammable liquid supplied to one of the first pre-mix zone, the second pre-mix zone, and the common mixing zone will also spread out to the other zones if the supply is continued. A person skilled in the art would appreciate that the introduction of non-flammable liquid would need to be controlled so that the common mixing zone is only partially flooded, allowing for the creation of a head space where the mixed gas may be removed.

Introduction of the first gas and the second gas into the first pre-mix zone and the second pre-mix zone, respectively, may comprise a single entry point or multiple entry points.

Back-flow of non-flammable liquid from any of the first pre-mix zone, the second pre-mix zone, and the common mixing zone and into entry points for the first gas, the second gas, and the non-flammable liquid can be prevented using any means known in the art. For example, gas supply nozzles for introducing the gas into the pre-mix zones may comprise a check valve that prevents the non-flammable liquid from entering the gas supply line through the nozzle. Also, the pressure difference between the line supplying the first gas or second gas is preferably higher than the pressure within the non-flammable liquid. This arrangement would also limit the flow of the non-flammable liquid out of the first pre-mix zone and the second pre-mix zone and into a gas supply line.

The continual use of the gas mixer of the present invention gives rise to the potential for buildup of contaminants and fouling within the gas mixer. For this reason, the non-flammable liquid should ideally be periodically replaced, either completely or by continual addition and removal of non-flammable liquid. In an embodiment of the invention, drains within at least one of the first pre-mix zone and second pre-mix are located in close proximity to the front end of the first pre-mix zone and or second pre-mix zone. These drains can be opened to allow drainage of the gas mixer. In an embodiment of the invention the one or more drains can be controlled so as to limit the rate of drainage, and by coordinating addition of non-flammable liquid with removal a relatively constant level of non-flammable liquid within the gas mixer can be maintained. This configuration allows for continual refreshing of the non-flammable liquid.

In another embodiment, the gas mixer may be flushed with non-flammable liquid during periods where no gas is introduced into the mixer. Flushing with non-flammable liquid may result in the solubilization and removal of fouling. For example, water soluble fouling may be removed by extended flushing with water. In an embodiment of the present invention multiple gas mixers may be employed such that during flushing of one or more mixers, additional mixers remain online and capable of accepting gases for mixing.

Construction of the gas mixer can be accomplished with a variety of materials including stainless steel, carbon steel, and any other material chemically compatible with the hydrocarbon to be mixed. Furthermore, the lining of the first pre-mix zone, the second pre-mix zone, and the common mixing zone may be coated with a spark suppressing material such as Teflon, sapphire, or oxide-based ceramic liners or the like.

The temperature, along with the pressure, play a role in determining what fraction of the non-flammable liquid may enter the gaseous state, joining the hydrocarbon and oxygen gas present in bubbles that are mixing and moving toward the flooded region of the common mixing zone. The temperature and pressure can be controlled to minimize the carryover of non-flammable liquid into the gas mixture leaving the mixer from the head space. Temperature control using a heater, either surrounding the gas mixer or within one or more of the first pre-mix zone, the second pre-mix zone and the common mixing zone, is contemplated for use with the present invention. Heaters for use in mixing vessels similar to that of the present invention are well known. In embodiment of the invention the gas mixer is temperature controlled using a heater that is external to the gas mixer. In another embodiment of the invention the gas mixer is temperature controlled using a heater that is located within at least one of the first pre-mix zone, the second pre-mix zone, and the common mixing zone.

The efficiency of mixing of the first saturated gas with the second saturated gas within the flooded region of the common mixing zone is dependent upon, among other things, the residence time and the frequency of interactions between bubbles of gas. In other words, how often do bubbles collide, break and reform together, permitting mixing of the gas compositions from each of the bubbles which combine to form the mixed gas. While mixing can occur naturally given sufficient time, it is not likely that the homogeneous gas mixture will comprise a relatively homogeneous mixture of the hydrocarbon and oxygen without internal mixing where collisions between bubbles are promoted. Without internal mixing the vessel would need to be of such height as to be not economically feasible. Means for promoting mixing are well known in the art and include use of a static mixers, random packing, structured packing, and impellers.

In an embodiment of the invention the common mixing zone comprises internal mixing means.

Static mixers promote mixing by creating a multitude of tortuous pathways that increase the distance that bubbles need to travel to reach the top of the vessel and consequently static mixers act partly by increasing the residence time. Also, the pathways comprise limited space that results in an increased probability that bubbles collide and ultimately mix to combine their gaseous contents.

Random and structured packing work by providing for increased residence time and probability of interaction between bubbles by creation of a plethora of winding pathways. Random packing involves filling at least a part of the common mixing zone with a packing material that comprises objects 68 of varying shape and size (FIG. 1) that create random pathways for the bubbles to follow as they rise to the top (see dashed arrow in FIG. 1). An example of commonly used random packing is glass beads of varying diameter.

Figure 2:
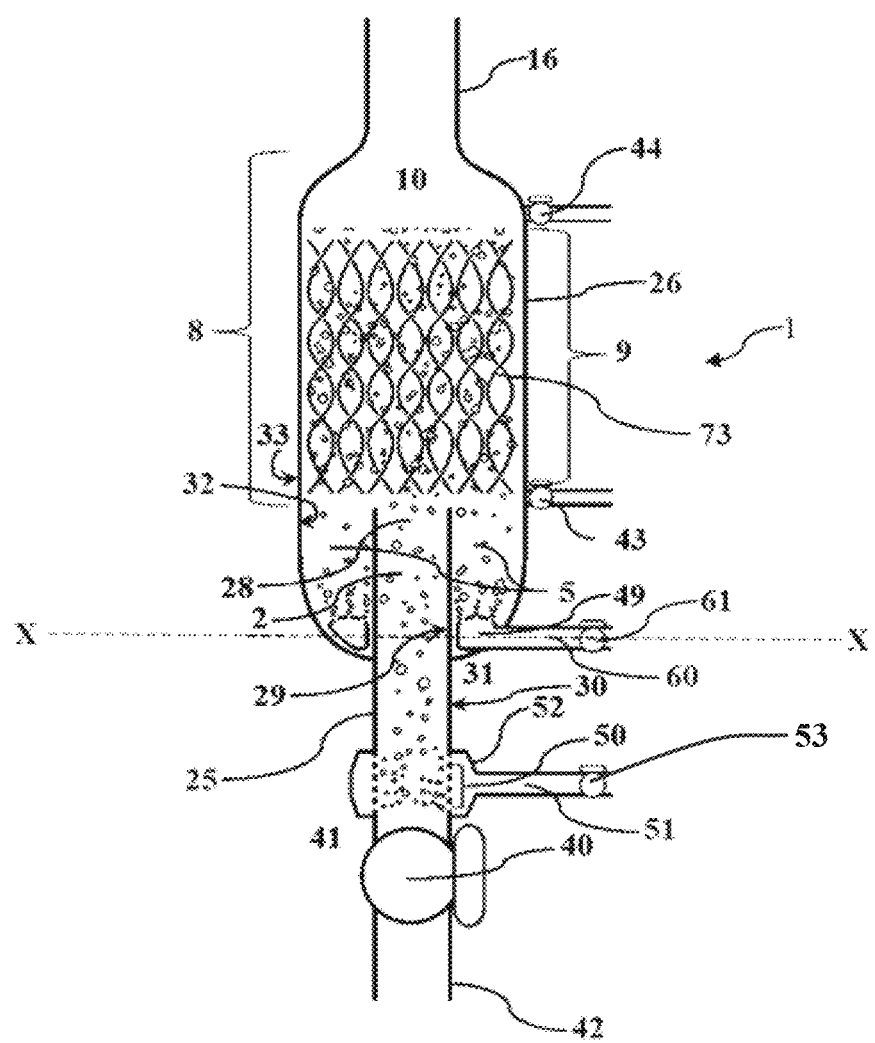
FIG. 2—Schematic representation of the pipe-in-pipe embodiment of the gas mixer of the present invention.

Structured packing also increases residence time and probability of contact between bubbles but differs from random packing in that the structured packing has an ordered arrangement so that most of the pathways are of a similar shape and size. For example, use of corrugated metal plates 73 (FIG. 2) provides a structured, as opposed to random, array of pathways. In another embodiment of the invention the internal mixing means comprises a structured bed. FIGS. 1 and 2 are provided as simplified examples for random and structured packing and should not be seen to limit the invention in any way. Also, while not shown in the Figures, random and/or structured packing need to be supported within the gas mixer using means known in the art.

The present invention also contemplates the use of power-driven mixers, which can promote interactions by creating flow within the vessel. Impellers include a rotating component 74 (direction of rotation shown by solid circular arrow), driven by a motor 75, that may force the non-flammable liquid, and associated bubbles of saturated gas, to the outside wall and away from the center of rotation. Impellers can create axial flow or radial flow depending upon design, and can be further sub-typed as propellers, paddles, or turbines. Furthermore, the position of the impeller may be subject to change through vertical movement throughout the common mixing zone. Motor driven pumping of an impeller further improves mixing.

In an embodiment of the invention the common mixing zone comprises internal mixing means selected from the group comprising a static mixer, a structured bed, random packing, and an impeller.

The internal mixing means, whether a static mixer, random or structured packing, or an impeller may be comprised of any material that is chemically compatible with the hydrocarbon to be mixed.

The shape and design of the gas mixer impacts the residence time of the bubbles within each of the first pre-mix zone, the second pre-mix zone, and the common mixing zone. The overall shape of the vessel is not critical, but the distance between where the first gas and the second gas enter the first pre-mix zone and the second pre-mix zone, respectively, and enter the flooded region, and the distance from the fluid connection between the common mixing zone and the first and second pre-mix zones and the headspace are. The point of first contact between the gases and the non-flammable liquid in the pre-mix zones should be a distance from common mixing zone that allows for a residence time that permits complete or near complete saturation prior to entering the common mixing zone. Furthermore, the size of the flooded region must be such that the residence time of the saturated bubbles of first gas and second gas is sufficient to the point where a relatively homogeneous mixture of the hydrocarbon-containing gas and the oxidant-containing gas is formed.

Another consideration for the optimum mixing of the bubbles of gas is the surface area over which the bubbles are dispersed within the common mixing zone. A larger surface area of dispersion promotes better mixing. More thorough mixing occurs when a larger number of smaller bubbles are dispersed over a larger surface area.

The final consideration is the removal of the homogeneous gas mixture from head space of the gas mixer, which can be accomplished with any variety of means for removal well known in the art.

Reference is now made to FIG. 1 which shows an embodiment of the gas mixer. The gas mixer 1 comprises, as shown in FIG. 1, first pre-mix zone 2, the second pre-mix zone 5, and the common mixing zone 8, contained within a closed vessel 20 comprising a top end 21 and a bottom end 22. The first pre-mix zone 2 is flooded with a non-flammable liquid (shaded) and comprises a first front end 3 and a first back end 4 and the second pre-mix zone 5 also flooded with the non-flammable liquid comprises a second front end 6 and a second back end 7. The first pre-mix zone 2 and the second pre-mix zone 5 are physically separated by partition 11 extending from the bottom end 22 of the closed vessel 20 to the common mixing zone 8, the common mixing zone 8 partially flooded with the non-flammable liquid creating a flooded region 9 and a headspace 10. In the embodiment shown in FIG. 1 common mixing zone 8 also comprises random packing, shown as a collection of solid gray circles. Bubbles of gas are shown as open circles. The size of the bubbles is for illustrative purposes and is not intended to limit the invention in any way. The first pre-mix zone 2 and the second pre-mix zone 5 are fluidly connected at the first back end 4 and second back end 6, respectively, to the flooded region 9. A first gas supply nozzle 12, located in close proximity to the first front end 3, allows introduction of the first gas into pre-mix zone 2, and a second gas supply nozzle 13 comprising a sparger, located in close proximity to the second front end 6, allows for introduction of the second gas into pre-mix zone 5. First gas introduced into first pre-mix zone 2 and second gas introduced into second pre-mix zone 5 form bubbles within the non-flammable liquid and the interiors of the bubbles may become saturated with gaseous non-flammable liquid as they pass from the first front end 3 and the second front end 6 towards the first back end 4 and second back end 6, respectively. Preferably, the interior of the bubbles of first gas and second gas are near complete saturation, forming bubbles of a first saturated gas and bubbles of a second saturated gas, which may separately enter the flooded region 9. Within the flooded region 9 the bubbles of the first saturated gas and bubbles of the second saturated gas mix to form bubbles containing a mixed gas comprising the first gas and the second gas, saturated with the gaseous form of the non-flammable liquid. The bubbles of mixed gas move through the flooded region (see dashed arrows within the random packing) and pass into the headspace 10, where they can be removed via mixed gas line 16.

In the embodiment shown in FIG. 1, it can be seen that the length of first pre-mix zone 2 and second pre-mix zone 5 are determined by the length of partition 11, which ideally extends a distance from the bottom end 22 that creates pre-mix zones long enough to provide for saturation, or near saturation, of the bubbles within the first pre-mix zone 2 and second pre-mix zone 5 with non-flammable liquid prior to reaching the flooded region 9.

In the embodiment shown in FIG. 1 non-flammable liquid may be added to the common mixing zone 8 via inlet 14 located at the top end 21. While not shown in FIG. 1, non-flammable liquid may also be added directly into the first pre-mix zone 2 or into the second pre-mix zone 5. The non-flammable liquid may be removed through drains (not shown) preferably located in close proximity to the bottom end 22 in one or both of the pre-mix zone 2 and the pre-mix zone 5.

In one embodiment, non-flammable liquid is introduced directly into the first pre-mix zone 2.

In one embodiment, non-flammable liquid is introduced directly into the second pre-mix zone 5.

Figure 3:
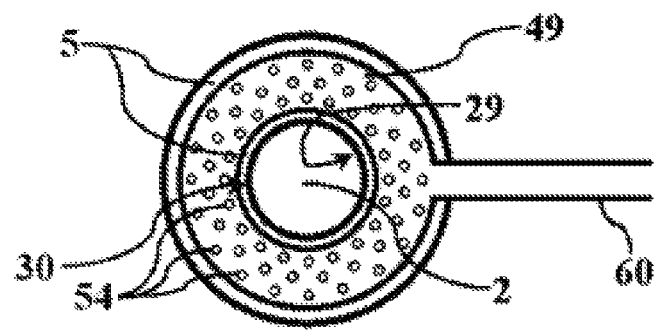
FIG. 3—Cross-section view of the pipe-in-pipe embodiment of the present invention, taken through the line X-X in FIG. 2.

Reference is now made to FIG. 2 and FIG. 3 which illustrate another embodiment of the gas mixer, called the pipe-in-pipe design. In this embodiment the gas mixer 1 encompasses a pipe-in-pipe design comprising an inner pipe 25 comprising an inner pipe end 28, an inner pipe inner surface 29, and an inner pipe outer surface 30, the inner pipe 25 "nested" inside an outer pipe 26 comprising an outer pipe end 31, an outer pipe inner surface 32, and an outer pipe outer surface 33. The term "nested" is intended to describe the insertion of inner pipe 25 within the hollow interior of outer pipe 26 such that inner pipe end 28 end is positioned within the hollow interior of outer pipe 26. The diameter of outer pipe 26 reduces in size to the point where outer pipe end 31 contacts inner pipe outer surface 30 and is sealed along the entire circumference of inner pipe 25. The reduction in the diameter of outer pipe 26 may be abrupt, creating an inward inflection or may comprise a rounded end (as shown FIG. 2) or a gradual taper. The degree to which the outer diameter of inner pipe 25 is smaller than then inner diameter of outer pipe 26 must be such that a space is created between inner pipe outer surface 30 and outer pipe inner surface 32. The second pre-mix zone 5 in this embodiment is formed by the space between inner pipe outer surface 30 and outer pipe inner surface 32 and extends from the seal between inner pipe outer surface 30 and outer pipe end 31 to inner pipe end 28. First pre-mix zone 2 is formed by the hollow interior of inner pipe 25 and common mixing zone 8, comprising the flooded region 9 and headspace 10, is formed by the hollow interior of outer pipe 26 past inner pipe end 28. The homogeneous gas mixture may be removed from the head space 10 via mixed gas outlet line 16.

Non-flammable liquid may be added via an inlet in at least one of the pre-mix zone 2, the second pre-mix zone 5, and the common mixing zone 8.

In an embodiment of the pipe-in-pipe design the first pre-mix zone 2 may be flooded with the non-flammable liquid by direct addition of non-flammable liquid via an inlet at any point along the inner pipe inner surface 29. In an embodiment of the pipe-in-pipe design, the first pre-mix zone 2 is flooded with the non-flammable liquid through a valve 40 at the front end 41 of inner pipe 25. Back-flow of non-flammable liquid out of the hollow interior and into the non-flammable liquid supply line 42 may be prevented by the valve 40, by higher pressure in the non-flammable liquid supply line 42, or both.

In an embodiment of the pipe-in-pipe design the second pre-mix zone 5 may be flooded with the non-flammable liquid by direct addition of non-flammable liquid via one or more inlets 43 present at one or more locations along the outer pipe inner surface 32.

In an embodiment of the pipe-in-pipe design the common mixing zone 8 may be partially flooded with non-flammable liquid by direct addition of non-flammable liquid via one or more inlets 44 at one or more locations along the outer pipe inner surface 32 past inner pipe end 28.

In an embodiment of the pipe-in-pipe design the first pre-mix zone 2 may be flooded with the non-flammable liquid by overflooding the second pre-mix zone 5 by direct addition of non-flammable liquid via an inlet at any point along the outer pipe inner surface 32 such that the non-flammable liquid spills over inner pipe end 28 and into first pre-mix zone 2 to the point where first pre-mix zone 2 is entirely flooded. In this embodiment common mixing zone 8 may also be partially flooded by overflooding second pre-mix zone 5 to the point where the level of non-flammable liquid rises past inner pipe end 28, creating the flooded region 9 and leaving the head space 10.

In an embodiment of the pipe-in-pipe design the second pre-mix zone 5 may be flooded with the non-flammable liquid by overflooding the first pre-mix zone 2 by direct addition of non-flammable liquid via an inlet at any point along the inner pipe inner surface 29 such that the non-flammable liquid spills over inner pipe end 28 and into second pre-mix zone 5 to the point where second pre-mix zone 5 is entirely flooded. In this embodiment common mixing zone 8 may also be partially flooded by overflooding first pre-mix zone 2 and overflooding second pre-mix zone 5 to the point where the level of non-flammable liquid rises past inner pipe end 28, creating the flooded region 9 and leaving the head space 10.

In an embodiment of the pipe-in-pipe design, the first gas is introduced into the first pre-mix zone 2 via one or more nozzles located on inner pipe inner surface 26.

In an embodiment of the pipe-in-pipe design, inner pipe 25 comprises a section of porous material 50, shown as gaps in the wall of inner pipe 25, and the first gas is introduced into the first pre-mix zone 2 via passage through the porous material 50 from a first gas supply line 51. The porous material may extend all the way along the circumference of inner pipe 25. Gas supply line 51 can lead to a manifold 52 that encompasses the porous material 50. The pressure of the first gas within the gas supply line 51 and within the manifold 52 exceeds the pressure within the hollow interior of inner pipe 25, promoting passage of the first gas across the porous material 50. Backflow of non-flammable liquid into the gas supply line 51, can be prevented by inclusion of a check valve 53 upstream of manifold 52.

In an embodiment of the pipe-in-pipe design, the second gas is introduced into the second pre-mix zone 5 via one or more nozzles located in close proximity to the front end of second pre-mix zone 5 on outer pipe inner surface 32.

In an embodiment of the pipe-in-pipe design, the second gas is introduced into the second pre-mix zone 5 via one or more spargers located in close proximity to the front end of second pre-mix zone 5.

In an embodiment of the pipe-in-pipe design, as shown in FIG. 2 and in cross-section in FIG. 3, the second gas is introduced into the second pre-mix zone 5 via a ring sparger 49 located in close proximity to the front end of second pre-mix zone 5. Ring sparger 49 encircles inner pipe 25 and is connected to a second gas supply line 60 comprising a check valve 61 for preventing backflow of non-flammable liquid into gas supply line 60 past check valve 61. The second gas enters second pre-mix zone 5 through sparger holes 54 arranged throughout the upper surface of ring sparger 49 (see FIG. 3).

Figure 4:
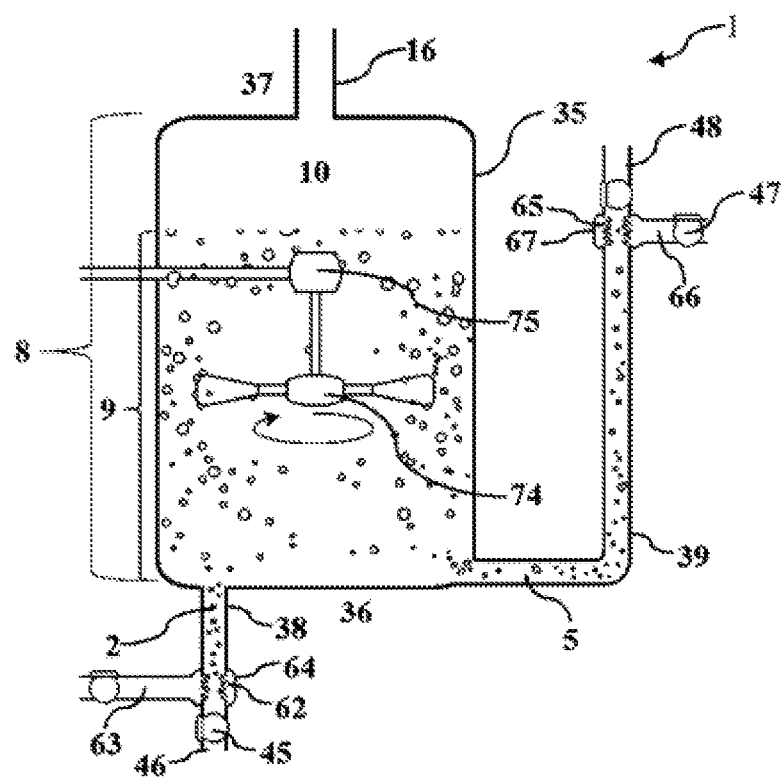
FIG. 4—Schematic representation of the standing pipe embodiment of the present invention.

Reference is now made to FIG. 4 illustrating another embodiment of the gas mixer, called the standalone design. The common mixing zone 8 of gas mixer 1 is contained within a standalone vessel 35 having a bottom end 36 and a top end 37, and first pre-mix zone 2 and second pre-mix zone 5 comprise the hollow interior of a first pipe 38 and a second pipe 39, respectively, that extend from the standalone vessel 35 in close proximity to the bottom end 36 of the standalone vessel 35. The fluid connection between the flooded region 9 and the first pre-mix zone 2 and the second pre-mix zone 5 is created by the point of contact between the open end of first pipe 38 and the open end of the second pipe 39, respectively, and the bottom end 36 of standalone vessel 35. The homogeneous gas mixture may be removed from the head space 10 via mixed gas line 16.

In an embodiment of the standalone vessel configuration, first pre-mix zone 2 is flooded with non-flammable liquid by direct introduction of non-flammable liquid via one or more inlets at one or more locations within the hollow interior of first pipe 38. In FIG. 4, the front end of first pipe 38 comprises a valve 45 from which non-flammable liquid can be introduced from non-flammable liquid supply line 46.

In an embodiment of the standalone vessel configuration, second pre-mix zone 5 is flooded with non-flammable liquid by direct introduction of non-flammable liquid via an inlet at any point within the hollow interior of second pipe 39. In FIG. 4, the end of second pipe 38 comprises a valve 47 from which non-flammable liquid can be introduced from non-flammable liquid supply line 48.

In an embodiment of the standalone vessel configuration, the common mixing zone 8 is partially flooded with non-flammable liquid by direct introduction of non-flammable liquid via one or more inlets at one or more locations within the hollow interior of standalone vessel 35 (not shown).

In an embodiment of the standalone vessel configuration, the common mixing zone 8 is partially flooded by direct introduction of non-flammable liquid into the hollow interior of standalone vessel 35, and first pre-mix zone 2 and second pre-mix zone 5 are flooded with non-flammable liquid by direct introduction of non-flammable liquid from the common mixing zone 8 via the fluid connection between the flooded region 9 and the hollow interior of first pipe 38 and the hollow interior of second pipe 39, respectively.

In an embodiment of the standalone vessel configuration one or both of first pipe 38 and second pipe 39 extend vertically downward from the bottom end 37 of standalone vessel 35. For example, in FIG. 4 the first pipe 38 extends vertically downward from standalone vessel 35.

In an embodiment of the standalone vessel configuration one or both of first pipe 38 and second pipe 39 extend horizontally from the bottom end 37 of standalone vessel 35. For example, in FIG. 4 the second pipe 39 extends horizontally from standalone vessel 35. In addition, second pipe 39 extends horizontally from standalone vessel 35 and bends upwards so that a section of the second pre-mix zone 5 is at a vertical position above the headspace 10.

In an embodiment of the standalone vessel configuration, the first gas is introduced into the first pre-mix zone 2 via one or more nozzles located on the inner surface of first pipe 38.

In an embodiment of the standalone vessel configuration, as shown in FIG. 4, the first pipe 38 comprises a section of porous material 62 and the first gas is introduced into the first pre-mix zone 2 via passage through the porous material 62 from a first gas supply line 63. The porous material may extend all the way along the circumference of first pipe 38 similar to the configuration shown in FIG. 2 in relation to the pipe-in-pipe design. First gas supply line 63 can lead to a manifold 64 that encompasses the porous material 62. The pressure of the first gas within the gas supply line 63 and within the manifold 64 exceeds the pressure within the hollow interior of first pipe 38, promoting passage of the first gas across the porous material 62.

In an embodiment of the standalone vessel configuration the second gas is introduced into the second pre-mix zone 5 via one or more nozzles located on the inner surface of second pipe 39.

In an embodiment of the standalone vessel configuration, as shown in FIG. 4, the second pipe 39 comprises a section of porous material 65 and the second gas is introduced into the second pre-mix zone 5 via passage through the section of porous material of second pipe 39 and from a second gas supply line 66. The porous material may extend all the way along the circumference of second pipe 39. The second gas supply line can lead to a second gas manifold 67 that encompasses the section of porous material of second pipe 39. The pressure of the second gas within the second gas supply line 66 and within the second gas manifold may exceed the pressure within the hollow interior of the second pipe 39, promoting passage of the second gas across the section of porous material of second pipe 39.

The means for introducing first gas into the first gas pre-mix zone and the second gas into the second gas pre-mix zone need not be the same.

The embodiments of the invention for the standalone configuration with respect to orientation of the pipes, the introduction of non-flammable liquid into one or more of the zones, and the introduction of the first and second gas are meant as examples only, and not intended to limit the invention in any way.

Another embodiment of the present invention relates to emergency shutdown procedures common to oxidative reaction processes. It is well known that when undesirable conditions occur in an oxidative reaction process an emergency shutdown procedure can be initiated to limit damage to equipment, reduce likelihood of personal injury, and prevent or minimize release of chemicals into the surrounding environment. Known emergency shutdown procedures include the cessation of adding reactants while at the same time providing a flow of an inert material, such as nitrogen, to the reaction zone to displace the reactants from the reactor. See U.S. Pat. No. 7,414,149 to DeCourcy and Le, assigned to Rohm and Haas Company, for an example.

In the present invention, it is contemplated that for an additional safety component an inert material inlet may be included for the introduction of a flow of an inert material into the head space. In addition, a suppression outlet leading from the head space to any known explosion suppression system may be included in the gas mixer. When an unsafe operating condition is detected at any point in the oxidative process, flow of an inert material through the inert material inlet can be initiated while the suppression outlet can be opened. These events can be coordinated with a reduction or termination of the flow of the first and second gas into the first and second pre-mix zones, respectively. The end result is that any mixed gases within the gas mixer are displaced to the explosion suppression system or to downstream components of the oxidative process. The flow of inert material acts as diluent and promotes movement in a single direction so that backflow of materials from the oxidation reactor to the gas mixer are prevented.

In an embodiment of the invention the gas mixer further comprises an inert material inlet for introducing an inert material into the head space of the gas mixer and a suppression outlet for removing gaseous mixtures from the head space and directing removed gaseous mixture to an explosion suppression system.

Oxidative dehydrogenation of paraffins to olefins is an alternative to the costly, energy intensive and environmentally unfriendly thermal cracking method currently used. In ODH, a stream of one or more alkanes are passed over a catalyst in the presence of oxygen, to produce corresponding olefins and a variety of byproducts that can be removed in downstream processing steps. Since in ODH the conversion of paraffins to olefins is assisted by a catalyst the required operating temperatures are significantly lower than the temperature required for thermal cracking. Also, for conversion of ethane to ethylene, ODH provides for higher conversion and selectivity rates. Despite these advantages ODH is not employed commercially due to the risk of thermal runaway of the reaction and consequential loss of containment. This risk is due to the requirement for mixing a hydrocarbon-containing gas with oxygen or an oxidant-containing gas.

Provided herein is a process for the oxidative dehydrogenation of a paraffin to a corresponding olefin. More specifically, provided herein is a process for oxidative dehydrogenation of ethane into ethylene comprising mixing of ethane and oxygen in a ratio that falls outside of the flammability envelope in a gas mixer having a first pre-mix zone, a second pre-mix zone, and a common mixing zone, to form a gas mixture of the ethane and oxygen, and optionally passing the mixture of ethane and oxygen through a heat exchanger to raise the temperature to at least 250° C., introducing the gas mixture into an ODH reactor containing an ODH catalyst to produce ethylene, carbon monoxide, carbon dioxide, water, acetic acid, minimal hydrocarbons, and possibly $O_2$, directing said products through a quench tower to remove water and acetic acid, directing the residual products through an amine wash to remove carbon dioxide, optionally followed by a caustic wash and drying, and finally through a demethanizer to remove methane, and if present, carbon monoxide and other compounds which have a boiling point lower than C2 hydrocarbons.

The use of the term ODH reactor includes use of more than one reactor and may include one or more of a fixed bed, fluidized bed, or microchannel reactor. Fixed bed reactors commonly described for ODH include shell-and-tube type reactors, including use of multiple zones separated by partitions, each zone comprising the same or different ODH catalysts. More than one ODH catalyst may be used, either within a single reactor or with different catalysts in separate reactors. Finally, the terms quench tower, amine wash, caustic wash, and dryer are meant to include use of more than one of each, in series. By in series it is meant that use of more than one of each means additional quench towers follow a quench tower, and additional caustic washes follow a caustic wash, and additional dryers follow a dryer.

By using the gas mixer and method of mixing a hydrocarbon-containing gas and an oxidant-containing gas discussed above the inherent risks of catalytic ODH are minimized. The mix of ethane and oxygen entering the reactor is outside the flammability envelope so that thermal runaway and subsequent explosion is not likely. Furthermore, by pre-mixing the gases a user can ensure consistent conversion due to the homogeneous nature of the ethane and oxygen mix, wherein the hydrocarbon-containing gas and the oxidant-containing gas pass through first and second pre-mix zones, respectively, and become saturated with non-flammable liquid before passing into the mixing zone where bubbles of hydrocarbon-containing gas and bubbles of oxidant-containing gas mix within the flooded region and combine to form bubbles comprising the homogeneous gas mixture, and the bubbles containing the gas mixture rise through and eventually exit the flooded region, release the gas mixture into the head space where it can be removed for use in the ODH process.

INDUSTRIAL APPLICABILITY

The present invention relates to a method and apparatus applicable for the safe preparation of a gaseous mixture of ethane and oxygen for use in an oxidative dehydrogenation process.

The invention claimed is:

1. A gas mixer, comprising:
i) a first pre-mix zone configured to be flooded with a non-flammable liquid and configured to receive a first gas to provide a first saturated gas saturated with a vapor of the non-flammable liquid;
ii) a second pre-mix zone, physically separated from the first pre-mix zone by a pipe, the second pre-mix zone configured to be flooded with the non-flammable liquid and configured to receive a second gas to provide a second saturated gas saturated with another vapor of the non-flammable liquid;
iii) a common mixing zone configured to be partially flooded with the non-flammable liquid to define a head space and a flooded region, the flooded region separately fluidly connected to the first pre-mix zone and the second pre-mix zone, and the common mixing zone configured to separately receive the first saturated gas and the second saturated gas; and
iv) a homogeneous gas mixture outlet configured to remove from the head space a homogeneous gas mixture comprising the first gas and the second gas;
wherein:
the first gas is different from the second gas;
each of the first and second gases is selected from the group consisting of a hydrocarbon-containing gas and an oxidant-containing gas;
the first saturated gas and the second saturated gas are combinable in the flooded region to provide the homogeneous gas mixture;
the first pre-mix zone is disposed within the second pre-mix zone;
a hollow interior of the pipe forms the first pre-mix zone;
the first pre-mix zone is flooded with the non-flammable liquid, through a valve disposed at a front end of the pipe, from a liquid supply line; and
the first gas is introduced into the first pre-mix zone, through a check valve, from a gas supply line.

2. The gas mixer of claim 1 wherein the non-flammable liquid comprises water.

3. The gas mixer of claim 1 wherein at least one member selected from the group consisting of the first pre-mix zone and the second pre-mix zone is configured to receive the first gas and the second gas via a nozzle.

4. The gas mixer of claim 1 wherein at least one member selected from the group consisting of the first pre-mix zone and the second pre-mix zone is configured to receive the first gas or second gas via a sparger.

5. The gas mixer of claim 1 wherein at least one member selected from the group consisting of the first pre-mix zone and the second pre-mix zone is configured to receive the first gas or second gas via an aerator nozzle.

6. The gas mixer of claim 1 further comprising a mechanism configured to introduce the non-flammable liquid into at least one member selected from the group consisting of the first pre-mix zone, the second pre-mix zone, and the common mixing zone.

7. The gas mixer of claim 1 further comprising a mechanism configured to remove the non-flammable liquid from at least one member selected from the group consisting of the first pre-mix zone, the second pre-mix zone, and the common mixing zone.

8. The gas mixer of claim 1 wherein at least one member selected from the group consisting of the first pre-mix zone and the second pre-mix zone is configured to receive the first gas or second gas via porous material.

9. The gas mixer of claim 1 further comprising a mechanism configured to control a temperature of the non-flammable liquid in at least one member selected from the group consisting of the first pre-mix zone, the second pre-mix zone and the common mixing zone, wherein the mechanism is selected from the group consisting of:
i) heat from a product recycle line;
ii) an external heater; and
iii) internal heater.

10. The gas mixer of claim 1 wherein at least one of the first pre-mix zone, the second pre-mix zone, and the flooded region comprises mesh screens configured to limit a size of bubbles of the first gas and second gas.

11. The gas mixer of claim 1 further comprising:
i) an inert material inlet configured to introduce an inert material into the head space; and
ii) a suppression outlet leading to an explosion suppression system to remove the homogeneous gas mixture from the headspace.

12. The gas mixer of claim 1 wherein the common mixing zone comprises a closed vessel having a top end and a bottom end.

13. The gas mixer of claim 12 wherein at least one of the first and second pre-mix zones comprises an interior of a standing pipe.

14. The gas mixer of claim 1 wherein at least one member selected from the group consisting of the first pre-mix zone, the second pre-mix zone and the common mixing zone further comprises a mechanism configured to mix gases present with the non-flammable liquid.

15. The gas mixer of claim 14 wherein the mechanism is selected from the group consisting of:
i) a static mixer;
ii) a packed bed;
iii) a structured bed;
iv) an impeller; and
v) combinations of i) through iv).

16. A method, comprising:
i) introducing a hydrocarbon-containing gas into a first pre-mix zone flooded with a non-flammable liquid to form a first saturated gas mixture comprising the hydrocarbon-containing gas saturated with a vapor of the non-flammable liquid;
ii) introducing an oxidant-containing gas into a second pre-mix zone flooded with the non-flammable liquid to form a second saturated gas mixture comprising the oxidant-containing gas saturated with another vapor of the non-flammable liquid, the second pre-mix zone being physically separated from the first pre-mix zone by a pipe;

iii) introducing, separately, the first saturated gas mixture and the second saturated gas mixture into a flooded region of a common mixing zone partially flooded with the non-flammable liquid and comprising the flooded region and a headspace;

iv) mixing the first saturated gas mixture with the second saturated gas mixture within the flooded region to form a homogeneous gas mixture comprising the hydrocarbon-containing gas, and the oxidant-containing gas saturated with non-flammable liquid; and v) recovering the homogeneous gas mixture from the headspace, wherein the first pre-mix zone is disposed within the second pre-mix zone, and the first pre-mix zone is flooded with the non-flammable liquid through a valve disposed at a front end of the pipe.

17. A method of operating a gas mixer comprising a first pre-mix zone physically separated from a second pre-mix zone by a pipe, each of the first pre-mix and second pre-mix zones comprising a front end and a back end, and a mixing zone continuous with the back end of each of the first and second pre-mix zones, the method comprising:

i) flooding the first and second pre-mix zones with a non-flammable liquid;

ii) partially flooding the mixing zone with the non-flammable liquid such that the mixing zone has a flooded region and a head space;

iii) saturating a hydrocarbon-containing gas with the non-flammable liquid in the first pre-mix zone;

iv) saturating an oxidant-containing gas with the non-flammable liquid in the second pre-mix zone;

v) mixing the saturated hydrocarbon-containing gas with saturated oxidant-containing gas in the flooded region to create bubbles of a homogeneous gas mixture, the homogeneous gas mixture comprising the hydrocarbon-containing gas and the oxidant-containing gas, the homogeneous gas mixture being outside of the flammability limit;

vi) allowing the homogeneous gas mixture to exit the flooded region and enter the head space; and vii) removing the homogeneous gas mixture from the head space, wherein the first pre-mix zone is disposed within the second pre-mix zone, and the first pre-mix zone is flooded with the non-flammable liquid through a valve disposed at a front end of the pipe.

18. A process comprising:

i) mixing an ethane containing gas and a oxidant-containing gas within a gas mixer comprising a first pre-mix zone flooded with a non-flammable liquid, the first pre-mix zone physically separated from a second pre-mix zone by a pipe, the second pre-mix zone flooded with the non-flammable liquid, and a mixing zone partially flooded with the non-flammable liquid to create a head space and a flooded region, the flooded region comprising an internal mixing mechanism and separately fluidly connected to the first and second pre-mix zones;

ii) recovering a gas mixture comprising ethane and the oxidant-containing gas, the gas mixture outside the flammability limit from the head space;

iii) passing the gas mixture through at least one ODH reactor comprising an ODH catalyst to form a product stream comprising unreacted ethane, ethylene, water, acetic acid;

iv) directing the product stream to at least one quench tower to remove acetic acid and water;

v) directing the product stream downstream of the at least one quench tower through at least one amine wash to remove carbon dioxide;

vi) directing the product stream downstream of the at least one amine wash through a demethanizer to remove a carbon monoxide component and a methane component, when present in the product stream, from the product stream; and vii) directing the product stream downstream of the demethanizer to a C2 splitter to separate the ethylene from the unreacted ethane, wherein the first pre-mix zone is disposed within the second pre-mix zone, and the first pre-mix zone is flooded with the non-flammable liquid through a valve disposed at a front end of the pipe.

* * * * *